United States Patent [19]

Waldman et al.

[11] Patent Number: 4,942,467
[45] Date of Patent: Jul. 17, 1990

[54] PREDICTOR CONTROLLED ENCODER FOR DIGITAL TRANSMISSION SYSTEMS

[75] Inventors: Harvey Waldman, Yardley, Pa.; Chung H. Lu, Plainsboro, N.J.

[73] Assignee: General Electric Company, Schenectady, N.Y.

[21] Appl. No.: 280,053

[22] Filed: Dec. 5, 1988

[51] Int. Cl.$^5$ ............................................. H04N 7/137
[52] U.S. Cl. ..................................... 358/135; 358/133
[58] Field of Search ...................... 358/133, 135, 136; 375/26, 27, 33

[56] References Cited

U.S. PATENT DOCUMENTS

| | | | |
|---|---|---|---|
| 4,141,034 | 2/1979 | Netravali et al. | 358/13 |
| 4,144,543 | 3/1979 | Koga | 375/27 |
| 4,742,391 | 5/1988 | Sorgi et al. | 358/133 |

Primary Examiner—Howard Britton
Assistant Examiner—Tommy D. Lee
Attorney, Agent, or Firm—James C. Davis, Jr.; Paul R. Webb, II

[57] ABSTRACT

A pre-encoder look-up table (LUT) provides output symbols for a statistical coder in response to signals representing a prediction of a prediction signal in a differential pulse code modulation (DPCM) system. The normal prediction signal is used as one address to the LUT and the prediction of that normal signal is used as a second address. The average probability distribution of the signals is determined to construct the LUTs wherein the output symbols are assigned values corresponding to different average probabilities of occurrence of the signal to be processed to thereby reduce the entropy further without adding overhead control symbols to the transmission system.

15 Claims, 6 Drawing Sheets

PREDICTOR CONTROLLED ENCODER FOR DIGITAL TRANSMISSION SYSTEMS

This invention relates to the digital transmission of sequences of images in certain television systems, such as those used for video teleconferencing.

BACKGROUND OF THE INVENTION

Of interest is Ser. No. 127,335 filed Dec. 1, 1987 entitled "DPCM SYSTEM WITH ADAPTIVE QUANTIZER HAVING UNCHANGING BIN NUMBER ENSEMBLE" by A. A. Acampora, Ser. No. 130,379 filed Dec. 8, 1987 entitled "MODIFIED STATISTICAL CODING OF DIGITAL SIGNALS" by N. J. Fedele and Ser. No. 158,171 filed Feb. 19, 1988 entitled "DECODER FOR DIGITAL SIGNAL CODES" by R. Hingorani et al. all assigned to the assignee of the present invention.

Differential pulse code modulation (DPCM) is an often-used step in data compression of digital signals representative of raster-scanned sampling of sequences of image frames. Further data compression can be obtained by subjecting the differential pulse code modulation signals to a structural coding procedure, such as the run length encoding of runs of successive zero-valued samples. Still further data compression can be obtained by a statistical coding procedure where variable length codes are assigned to various differential pulse code values or structural codes, with shorter length codes being assigned to more frequently encountered conditions and longer length codes being assigned to less frequently occurring conditions. Statistical coding is generally carried out using a look-up table, wholly or partially stored in read-only memory (ROM) or its like.

In the prior art, the statistic encoding of DPCM signals and the statistical coding of mixtures of DPCM signals and structural codes derived therefrom has generally presumed independence of events in the acquiring of statistics concerning the frequency of those events. A single look-up table based on these statistics is used for coding.

In digital image transmission systems using DPCM, however, running statistics can be kept over substantially large numbers of consecutive samples (which procedure is sometimes referred to as histogram generation) and the entries in the look-up table can be modified from time to time reflective of change in the statistics concerning the frequency of events. To implement this procedure, a library of look-up tables for statistical coding can be kept, one of which is selected at a time, selection being based on best fit to the statistics of the signal as determined from large numbers of consecutive samples. These procedures find their intellectual basis for being used in the fact that only most of the time are there good degrees of correlation between spatially adjacent samples in the case of intraframe DPCM and between corresponding samples in successive frames in the case of interframe DPCM. Such correlation when it occurs reduces the populations of higher-value DPCM samples relative to the populations of lower-value DPCM samples, when a large number of samples are considered. Having alternative coding tables available helps accommodate conditions where such correlations do not obtain—e.g. when there is a lot of motion in the sequence of image frames being digitally transmitted. The foregoing procedures were known to some highly skilled in the image encoding art prior to the invention to be described.

The present invention does not rely on correlation between the absolute values of image samples on a pair-wise basis for selecting among different statistical coding procedures. Rather the invention relies on the effects upon DPCM statistics caused by restrictions on dynamic range in the descriptions of how each of the samples differs from another sample used to predict its value. One restriction on dynamic range is imposed by the digital channel capacity in terms of bits per sample. Other restrictions may be imposed by slew rate limitations on the original video signals that are to be digitally transmitted, i.e., rate of change of adjacent pixel values. In intraframe DPCM where samples are predicted from respective just-preceding samples in the same scan line such slew rate limitations tend to be imposed on digital video signals derived from analog video signals. In interframe DPCM where samples are predicted from samples in the preceding scan line, such slew rate limitations will not be found absent transversed filtering steps being taken prior to differential pulse code modulation taking place. In interframe DPCM unless temporal filtering procedures of frame-averaging nature are followed, slew rate limitations will not be found between samples in one image frame and correspondingly located samples in the preceding image frame.

The invention takes advantage of the fact that information concerning a previous sample used for prediction in a DPCM transmission system permits elimination of certain ranges of difference between that previous sample and the current sample in a DPCM coding procedure, so that the number of bits available per DPCM code sample may be more efficiently allocated to describe the possible ranges of difference. That is, binning in the DPCM quantizer can be made to describe finer variations in the difference for a given number of bits per DPCM code sample. At the same time, a different set of statistical codes can be selected for statistically encoding the DPCM (as may be modified by run-length encoding of zero-value DPCM samples).

SUMMARY OF THE INVENTION

An aspect of the invention is embodied in certain coders for digital television transmission of sequences of image frames, which coders use digital pulse code modulation followed by run-length coding of zero-value samples and then by statistical coding. In these certain coders the sample used as a predictor in generating PCM, or a weighted variant thereof, is used to modify the choice of coding statistics.

A further aspect of the invention is embodied in decoders for operation in cooperation with the coders described above.

DETAILED DESCRIPTION

Figure 1:
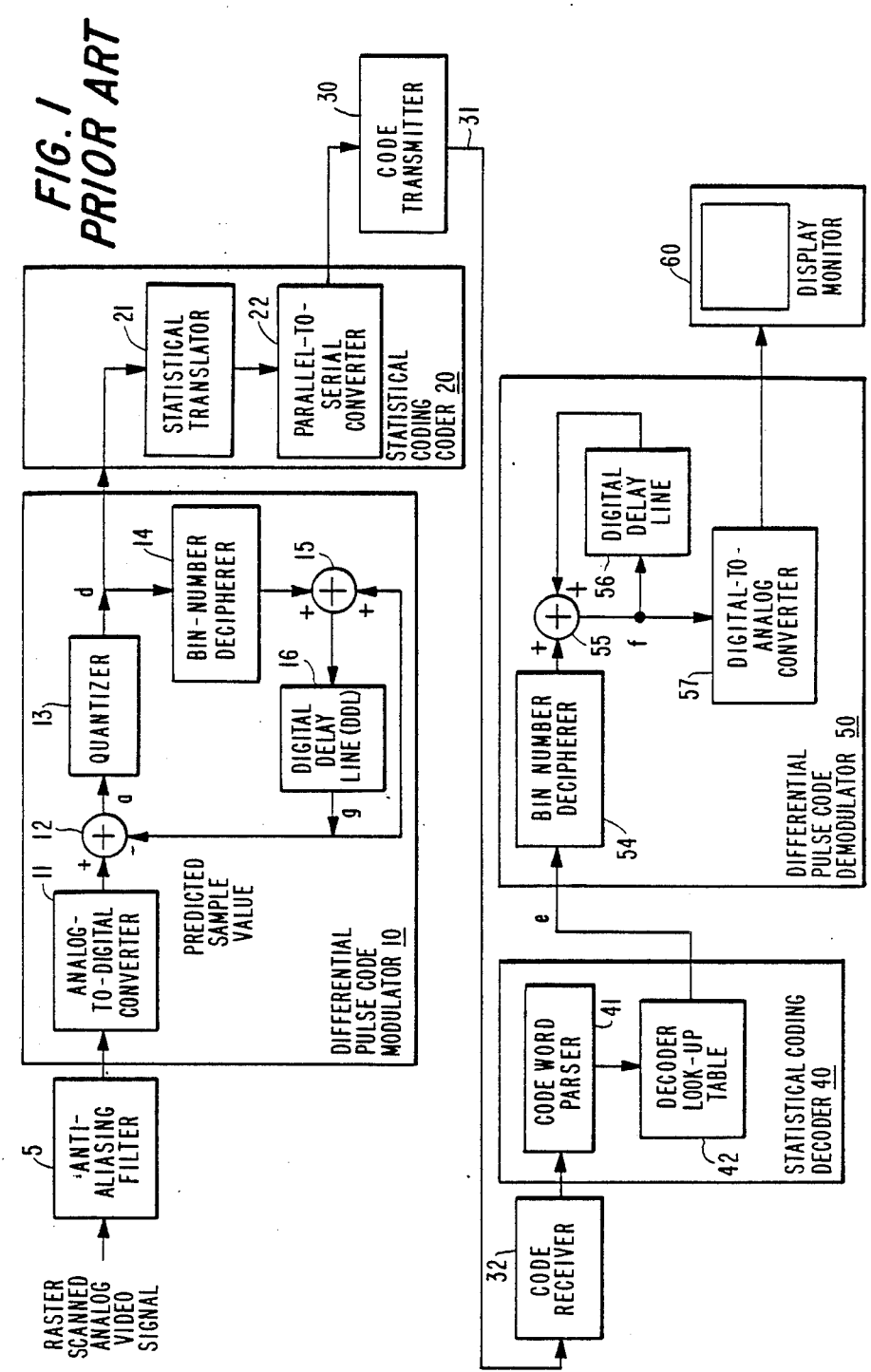
FIG. 1 is a block diagram of a prior art one-way digital television transmission system as used in pairs to form a video teleconferencing system.

In the FIG. 1 prior-art television transmission system, a raster-scanning video signal descriptive in analog terms of a sequence of image frames is supplied to an anti-aliasing filter 5 that suppresses above-band frequency components in its output response, supplied as input signal to a differential pulse code modulator 10. Modulator 10 includes an analog-to-digital converter (ADC) 11 for digitizing filter 5 output response into a range of values. Modulator 10 also includes a subtractor 12 for subtracting a predicted sample value, signal g, from the value of each sample supplied its minuend input port from ADC 11. The difference signal, sometimes referred to as an error signal, subtractor 12 provides, signal a, is applied to a quantizer 13 within modulator 10. The range of the ADC output is divided by quantizer 13 into range bins, which are given respective bin numbers. Each ADC output sample is assigned to one of these range bins in quantizer 13; and the bin number is specified at quantizer 13 output port, which is also modulator 10 output port, signal d. The lowest amplitude samples are in a range bin called the "zero bin" irrespective of the bin number ascribed to that bin.

The bin numbers are supplied to a bin number decipherer 14 which generates a nominal value of bin content significantly fewer in number than the number of values produced by ADC 11. The nominal value is added in an adder 15 to the predicted sample value, signal g. The resultant sum is applied to a digital delay line (DDL) 16, sometimes referred to as a predictor. DDL 16, which may be m samples in length, generates the subsequent predicted sample signal g for application to subtractor 12 subtrahend input port and to the addend port of adder 15 other than that to which the nominal value of bin content is applied.

The delay of DDL 16 may take a number of different forms. The delay may be the value of a positive integer m which is unity, a delay of one sample, in one form of intraframe DPCM and in another form of intraframe DPCM m is H, a delay corresponding to the number of samples per scan line of the digitized video signal. In still other forms of intraframe DPCM m can be $(H+1)$ or $(H-1)$, respectively. Forms of intraframe DPCM are also known where the predicted sample value, signal g, is formed from a weighted average of a plurality of the samples delayed by $m=1$, $m=(H-1)$, $m=H$ and $m=(H+1)$. In interframe DPCM, the delay time through digital delay line 16 is one frame. Variants of interframe DPCM delay time may include one frame less one sample, one frame less $(H-1)$ samples, one frame less H samples or one frame less $(H+1)$ samples.

Linear DPCM can be generated using a quantizer 13 that rounds towards zero difference signals from subtractor 11 to a prescribed number of more significant binary places to generate bin numbers. Bin number decipherer 14 is dispensed with and the quantizer 13 output signal comprising an assigned value for each bin range is applied directly to adder 15.

Bin numbers are supplied from differential pulse code modulator 10 to a symbol statistical coder 20. Symbol statistical coder 20 comprises a statistical translator 21 employing a ROM stored look-up table (LUT) which translates the quantizer 13 output signal values into codewords based on statistical parameters. For example, such translation coders may employ Huffman codes or other statistical coding schemes or a combination including run length codes or other structural coding schemes. Normally, the quantizer output signal bin values are based on frequency of occurrence probability values. These latter values are translated by translator 21 whereby shorter codeword lengths are assigned to the more frequently occurring signal values and the longer codeword lengths are assigned to the less frequently occurring signal values. Normally the dynamic range of the quantizer is fixed, is nonuniform to allow for a wide range of input signal statistics and is based upon the anticipated dynamic range of the response, error signal a, produced by subtractor 12. The dynamic range of such error signals is normally based on anticipated correlation between the absolute values of image signals on a pair-wise basis. Such correlation is the basis of a given LUT used in translator 21.

For example, a set of successive images of a given content are computer simulated. The differences in pixel values of the simulated images are counted and a histogram of the image statistics prepared in which the dynamic range of the probability of occurrences of difference values are displayed. Based on these global statistics, an LUT is constructed based on Huffman or other statistical encoding proceedings. The problem, as discovered by the present inventors with using the global statistics of the dynamic range of the error signals produced by subtractor 12 is that such global ranges are subject to certain restrictions, which in a practical sense, limit the extent of a given known error signal value to a predictable subrange of the global range making the global range inefficient.

In effect, certain signal values of such prior art statistics are assumed to occur in ranges of occurrences which in fact are so global as to introduce inefficiencies in the translation process which statistically treats certain signals as occurring more frequently than actual. It can be shown, as will be discussed below, for example, that certain signal values if correlated to a given subdynamic range have a set of probability statistics ranges narrower than the global range statistics generated for that value. By ascertaining the actual dynamic range of a given signal based on its subrange statistics, the frequency of occurrence of that signal value has a closer correlation to a determinable subdynamic range than to its subsumed global range. All of this will become clearer upon explanation of the present invention in connection with the description of FIGS. 2 and 3 below.

The output of translator 21 is a parallel set of bits representing a codeword corresponding to a given value of signal d. These bits are converted to a serial stream of bits by parallel-to-serial converter 22. The output signal of converter 22 is applied to code transmitter 30. Code transmitter 30 transmits signals descriptive of its code input from symbol coder 20, via a transmission channel 31 to a code receiver 32 at another station. Code transmitter 30 may be a phase-shift keying radio-frequency transmitter for transmitting over a transmission channel 31 established by satellite link to code receiver 32, for example.

Symbol codes recovered by code receiver 32 are supplied to a symbol decoder 40. Symbol decoder 40 includes a variable-bit-length code word parser 41 for addressing a statistical coding decoder look-up table 42 included in symbol decoder 40. Decoder look-up table 42 complements the coder look-up table in translator 21. Look-up table 42 recovers modified DPCM where zero value samples have run-length codes substituted therefor, which recovered modified DPCM samples are supplied to a rate buffer (not shown) within symbol decoder 40. Responsive to run length codes, zero-value runs are regenerated by zero-insertion circuitry which controls the rate buffer. The zero-insertion circuitry is included in symbol decoder 40; and its output port is the output port of symbol decoder 40 from which restored DPCM signal samples, signal e, both zero-valued and non-zero valued, are supplied to a differential pulse code demodulator 50. One example of a coder 20 is shown in copending application Ser. No. 130,379 and one example of a decoder is shown in copending application Ser. No. 158,171 mentioned in the introductory portion.

Demodulator 50 includes a bin number decipherer 54, which may be replaced by direct connection where linear DPCM is used, whose response is applied to a first addend input port of an adder 55 included in demodulator 50. The sum output of adder 55 is applied to the input port of a digital delay line (DDL) 56 included in demodulator 50. Digital delay line 56 is m samples in length the same length as DDL 16, and supplies a predictor sample, signal f, at its output port to a second addend port of adder 55. The sum output of adder 55 as delayed by digital line 56 (or alternatively that sum output taken directly) is applied to a digital-to-analog converter (DAC) 57 included in demodulator 50. The analog response of DAC 57 is the output signal from demodulator 50, which is applied to a display monitor 60 which displays a sequence of image frames.

While the description of operation has been cast in terms of the digital transmission of a single video signal—e.g. a luminance signal—it will be appreciated by those skilled in the art that multiplex operation permits transmitting a plurality of video signals descriptive of full color representations of the sequence of image frames and transmitted by an accompanying sound signal. In a two-way system such as that used in video teleconferencing, camera control signals for the other system half may also be multiplexed into the video and sound transmission.

The use of DPCM in the FIG. 1 system produces an input signal for symbol coder 20 the average variance of which is much smaller than that of the digitized video signal produced by ADC 11. Quantizer 13 more coarsely quantizes the amplitudes of the difference signals from subtractor 12 reducing the number of various values that symbol coder 20 must encode, which improves coding efficiency. However some information is lost in this coarse quantization procedure and image quality at display monitor 60 suffers to some degree. Quantizer 13 also substantially increases the number of zero values and thus the likelihood of successive zero values of samples in the input signal to symbol coder 20. This substantially increases coding efficiency owing to the runs of zero-value samples being run-length encoded.

ADC 11 allows the digitized video signal it supplies to range over only a plurality p in number of values. Ignoring the effect of quantizer 13 in eliminating certain possible signal values, the predicted sample signal g at the output port of digital delay line 16 also ranges only over p values in a range similarly bounded to the range of ADC 11 output signal. Ignoring the possibility of slew rate limitations, times may occur when ADC 11 and digital delay line 16 output signal are at opposite ends of their respective ranges. Subtractor 12 output signal a ranges over a global range of $2p-1$ values ranging between $(-p+1)$ and $(p-1)$. If quantizer 13 is symmetrical about zero in eliminating possible sample values, reducing them by a proper fraction Q, quantizer 13 output signal d has a global range of $(2p/Q)-1$ possible values.

This signal d is the input signal for symbol coder 20 and absent transmission errors this signal is recovered as the output signal e of symbol decoder 40. Differential pulse code demodulator 50 responds to this signal e identically to elements 14–16 of differential pulse code modulator 10, so the input signal f to DAC 57 is identical to the output signal g of digital delay line 16 (assuming no transmission error) and ranges over n values.

In the case where ADC 11 is digitizing luminance signals, which are invariably positively valued, the n-value range of ADC 11 will range from 0 to $(p-1)$ inclusive. The n-value range of digital delay line 16 output signal g will range from 0 to $(p-1)$ inclusive. As noted before, subtractor 12 output signal a ranges between $(-p+1)$ and $(p-1)$. However, if the value g of the prediction sample at the output port of digital delay line 16 is known, the range of subtractor 12 output signal a extends from $-g$, when ADC 11 output signal is of value zero, to $(p-g-1)$, when ADC 11 output signal is of value $(p-1)$. This is a range of $(p-1)$ values, about half the range of possible values that would have to be considered were g not known.

Figure 4A:
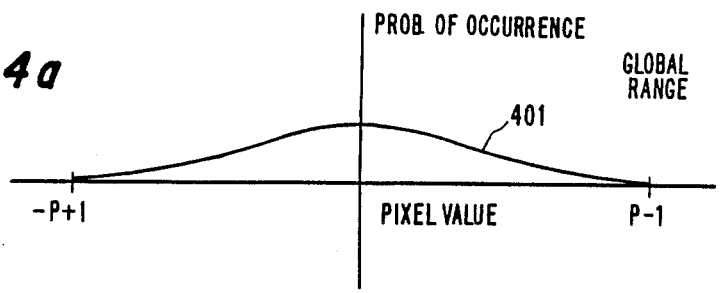
FIG. 4 is a diagram of probabilities useful in explaining the present invention.

For example, in FIG. 4a, a distribution curve 401 is shown in which the nominal range of probabilities of the values of the subtractor 12 response signal a varies over a range of $(-p+1)$ to $(p-1)$. Disregarding quantizer 13, knowing the value of g, the statistical range of subtractor 12 response signal a is given in FIG. 4b by curve 402 in solid line. Curve 403, dashed line, is when the delay line 16 output has a value $g_1$ greater than g and curve 404, broken line, is when the delay line 16 output has a value $g_2$ greater than value $g_1$. In practice, the units are determined by the quantizer and are somewhat reduced. Thus, knowing something about the delay line 16 output value signal g provides a narrower subrange of the probabilities of occurrence of the error signals produced by subtrator 12, which subranges are significantly more descriptive of the statistics of the values of the pixels then being processed. Since the curves 402, 403 and 404 are different for different values of g, the present invention contemplates a solution wherein the encoding scheme of coder 20, FIG. 1, is modified to include tables based on the known statistics of the error signal a.

Figure 4B:
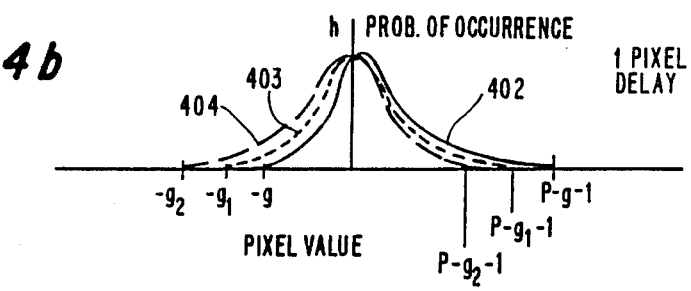

It should be understood that the areas under the curves of FIGS. 4a and 4b are the same. The difference is the population distributions. The peaks of curves 402–404 are about twice the value of curve 401 and the actual range of pixel values of curves 402–404 is significantly reduced relative to curve 401. It can be shown that the entropy $H(x)$ of the different curves of FIGS. 4a and 4b are related to $\sigma_x$, the distribution of the values, and that the smaller the $\sigma_x$, the lower the entropy. In general, there is a tendency that smaller $\sigma_x$ have smaller $H(x)$ for a given population.

These relations are taken advantage of in the present invention by constructing a plurality of tables each based on a given value of g for translating the values of signals d.

TABLE I

| g = | 1 | 3 | → |
|---|---|---|---|
| Highest probability 0 | 3 | 4 | → |
| 1 | 6 | −2 | |

TABLE I-continued

| | g = | 1 | 3 | → |
|---|---|---|---|---|
| | 2 | 5 | −1 | |
| h | 3 | 0 | 0 | d |
| | 4 | −1 | 3 | |
| | 5 | 1 | −3 | |
| | 6 | 2 | 2 | |
| Lowest probability | 7 | 4 | 1 | → |

In Table I, each value of h represents an assigned probability of occurrence value corresponding to a specific combination of values of signals d and g, FIG. 1. The table illustrates a range of values of h for only two values of g, 1 and 3, and eight values of d. There are thus two values of h for a given value of d. In practice, all values of g and d would be included in the table. There may be 1 through p possible values of h for all values of d and g. While Table I is illustrated in terms of g and h as coordinates for the values of d, a similar table may be constructed using any of the variables d, g or h as coordinates with the third variable in the body of the table (e.g., d Table I). Because d and g are respectively representative of the DPCM signal and a signal derived from the DPCM signal (the prior prediction), these two latter signals are the controlling factors for a given value of h. In other words, for each value of g, for example, a set of values of h can be derived corresponding to a set of values of d. This will all become clearer upon explaining how Table I is constructed.

Table I is constructed as follows. The values given in Table I are exemplary only for purposes of illustration. For each given g value, assign a highest probability value to h for that value of signal d which in combination with that g value has the highest probability of occurrence. This h value always corresponds to the highest probability of occurrence of signal a for that g value. For example, in Table I, for g value 1, assign h value 0 for the highest probability of occurrence of signal d, assigned to be value 3. For signal g value 3, assign h a value 0 the highest probability of signal d assigned to be value 4. Assume signal d value 6 when g is 1 has the second highest probability of occurrence. Assign h a value 1 for this combination of d and h. Similarly, assume a signal d value of −2 for g is 3 is a second highest probability. Assign h a value 1 for this combination. Assume when d has a value 4 and g is 1, this is the lowest probability of occurrence. Assign h the value 7. This value 7 also corresponds to d is 1 and g is 3.

In this manner a plurality of tables are constructed for all possible values of g and d assigning values to h in a given range of values according to the probabilities of each value of signal d for each signal g value. The probabilities of signals g and d are determined by computer simulation for a given sequence of video images. A histogram is compiled from those statistics and the values g, d and thus h determined. Each specific combination set of values of d and g has a unique h value. The values of d and g can serve as addresses to a ROM or other memory device in which the corresponding h value is stored and outputted when the ROM is addressed. A large set of tables of corresponding d, g and h values are thus stored. The population distributions of h is represented in FIG. 4b by curves 402-404 for different values of g as discussed above. A combination of a given g value with a given d value gives a table comprising a range of h values. For n possible g values, there are thus n tables. Because there are fewer values of h, the quanitzer 13 can be made uniform and the resultant more finely quantized signal loses less information.

Accordingly, it is possible to use a selected set e.g., (p−1) in number, of a larger number of smaller range bins in quantizer 13, without increasing the number of bin numbers for each different value g of the prediction sample. The finer quantization permits uniform quantization, where the range bins are of equal respective extents.

Figure 2:
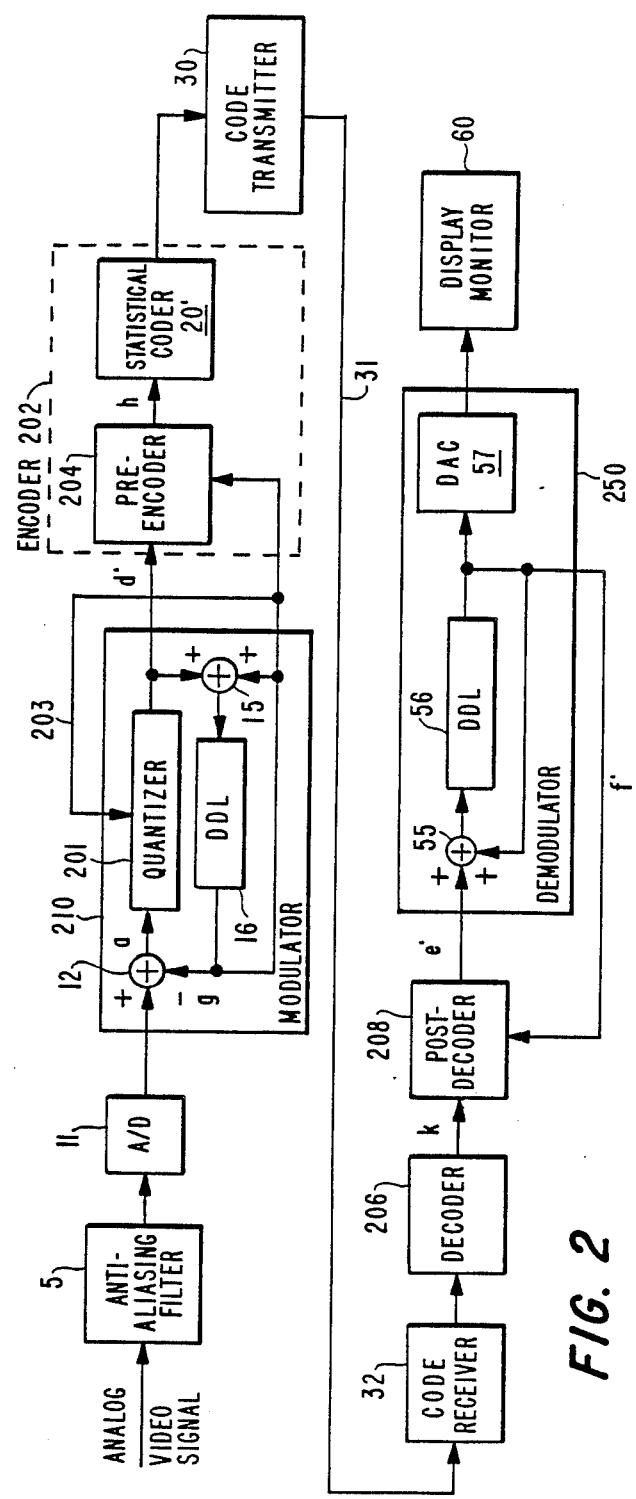
FIGS. 2, 3 and 6 are block diagrams of the FIG. 1 one-way digital television transmission system modified in accordance with different emobidments of the invention.

FIG. 2 shows a one-way digital television transmission in which changes are made from the FIG. 1 system, in accordance with one embodiment of the invention. Parts with the same reference numerals in the different figures are identical. Differential pulse code modulator 210 differs from modulator 10 in that quantizer 13 is replaced by a uniform quantizer 201 and in that bin number decipherer 14 is replaced by direct connection. This modification in differential pulse code modulator 210 is reflected in a modified differential pulse code demodulator 250 in which bin number decipherer 54 is replaced by direct connection.

Encoder 202 includes symbol coder 20' and a pre-encoder 204 comprising a ROM and address registers responsive to input signals d' and g. Signal d' is the output of modulator 210. Signal d' differs from signal d, FIG. 1, by reason of the uniform quantizer 201 replacing the non-uniform quantizer 13. Signals d' and g serve as addresses to address registers (not shown) in pre-encoder 204 for addressing the look-up tables (LUT) of pre-encoder 204. The LUT contains the values of h discussed above in connection with Table I. The ROM of pre-encoder 204 contains as many values of h as there are different combinations of signal d' and g. Pre-encoder 204 in effect constitutes a number of individual component look-up tables each table being associated with a respective value of g.

In the receiver, symbol decoder 206 is decoder 40, FIG. 1, modified to produce the recovered sample k corresponding to sample h. Post-decoder 208 in response to signal k and demodulator 250 output signal f' produces signal e' which corresponds to signal d' in the transmitter. The output signal f' of demodulator 250 corresponds to signal g and with signal k form an address for addressing the post-decoder 208 to select that component decoder LUT therein which corresponds to the component coder LUT used in the encoding procedure.

The post-decoder 208 performs the inverse function of pre-encoder 204 in that decoder 208 contains a plurality of look-up tables whose addresses comprise signals f' and k. The tables of decoder 208, for example, are similar to Table I where the value of f' corresponds to the value of g, the value of k corresponds to the value of h and the value of e' corresponds to the value of d. Because of the large number of values created by the combination of signals g and d', in practice, an additional quantizer (not shown) would be added to quantize signal g prior to addressing pre-encoder 204 to reduce the number of possible combinations.

The output of delay DDL 16, signal g, is also applied via line 203 to quantizer 201 which is adaptively changed based on the values of g. To make quantizer 201 more uniform, signal g addresses the quantizer 201 to change the size of the range bins based on the value of g. That is, the bin ranges may be increased or decreased in extent according to a given g value to accommodate the number of different possible h values. For example, for g=0, the bin ranges are widest and for pixels at −g and p−g−1 the ranges are the smallest. See FIG. 4b. Adaptive quantizers are well known and need not be described further herein. Such an adaptive quantizer is made finer and the amount of information lost due to quantizing is reduced.

Analysis of the statistics involved in creating FIG. 4b reveals that further reduction of the entropy of signal h is possible. The variable in FIG. 4b is the value g. As g changes, the tails of the curves 402–404 move to thereby increase the values of the curve peaks to thereby concentrate the area of the curves in a narrower range, i.e., lower the entropy. By weighting a variable corresponding to g it was discovered that the entropy could be reduced even further. However, in this sense, the embodiment of FIG. 2 which uses the variable g and which represents a one pixel delay, represents a specific embodiment of a more general embodiment.

Figure 3:
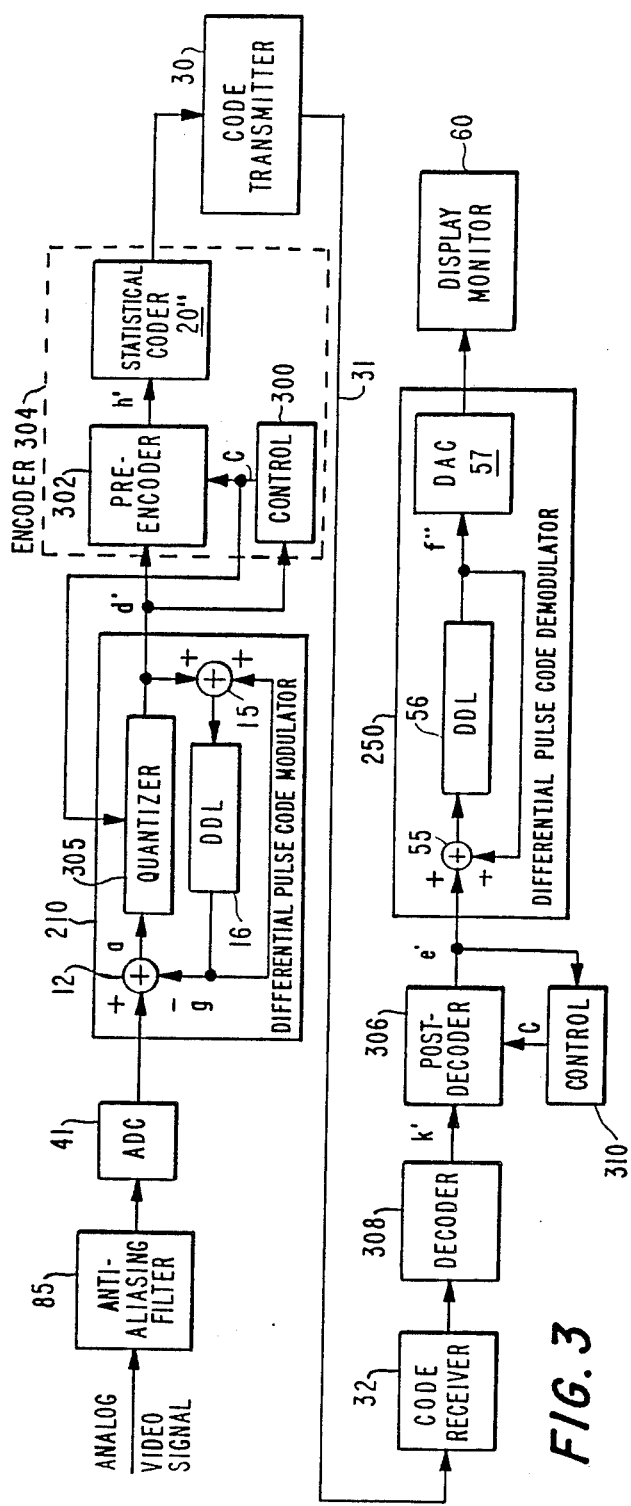
Figure 4C:
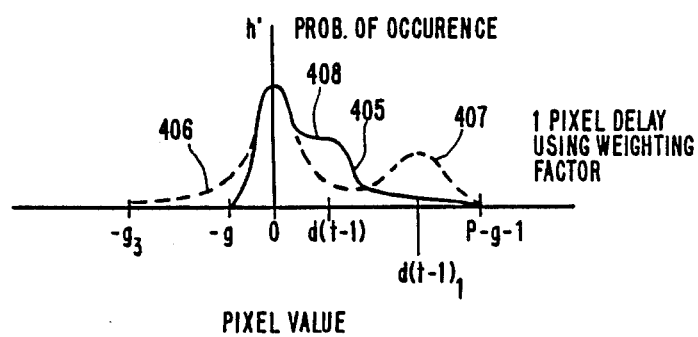

In FIG. 4c, a set of curves 405 and 406 of a much larger family of curves are shown based on the values d' of modulator 210, FIG. 3, and the signal d' delayed one pixel. The result is a bimodal curve. In FIG. 4c, the term d(t−1) represents the value of the prior pixel. When this value is small curve 405, solid line, is produced which ranges from −g to p−g−1. The portion 408 of curve 405 shows the skewed distribution due to the value of the previous d'. The area under curve 405 is the same as that under curve 402 of FIG. 4b and curve 401 of FIG. 4a. The large population at zero is due to the large number of zero values. A second large population is centered at value d(t−1). Where the average prior pixel value d(t−1) of the signal d' is large relative to d(t−1), for example, d(t−1)$_1$, dashed curve 406 results. The range of values in this case goes from −g$_3$ to p−g−1 with a large population at zero and a second large population 407 centered on the value of d(t−1)$_1$. It can be shown that the entropy of signals corresponding to curves 405 and 406 are lower than the entropies of curves 402–404, FIG. 4b, because the population distribution limits $\sigma$ is smaller. By providing additional control signals based not only on a weighted one pixel delay, but weighted one line delay with a one pixel delay and a weighted one frame delay with a one pixel delay, even lower entropy of the curves corresponding to FIG. 4c can be produced, i.e., smaller $\sigma$s.

In FIG. 3, the encoder 304 differs from encoder 202 of FIG. 2 in that the connection of the ouptut of DDL 16 to pre-encoder 302 is removed and control 300 is added. Control 300 is responsive to the output response of modulator 210, signal d'. Control 300 produces a control signal C which with signal d' addresses the LUTs of pre-encoder 302. Signal C is also used to adaptively change quantizer 305 to make it more uniform in a manner similar to that described for quantizer 201 in response to signal g, FIG. 2. Pre-encoder 302 comprises a plurality of LUTs and address registers for addressing a given LUT based on the value of signals C and d'.

Figure 5:
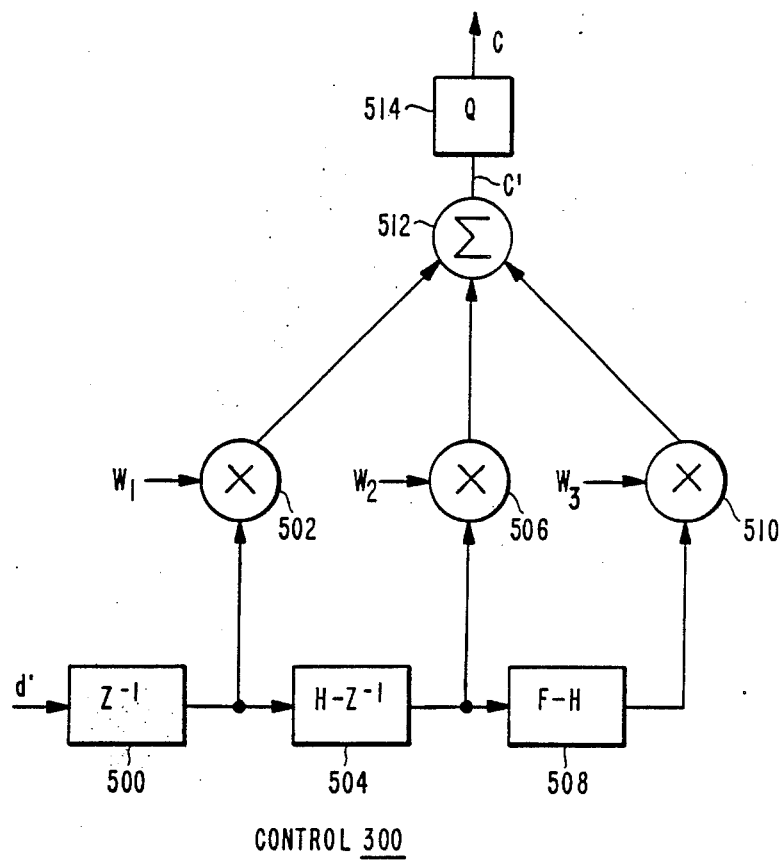
FIG. 5 is a block diagram of a control useful in the embodiment of FIG. 3.

Control 300 is shown in more detail in FIG. 5. Control 300 is configured somewhat like a filter and includes a digital delay 500 for providing a one pixel delay to signal d'. The response of delay 500 is applied to a multiplier 502 and a second digital delay 504. Delay 504 is a one horizontal line delay minus a one pixel delay. The response of delay 504 is applied to multiplier 506 and delay 508. Delay 508 is a one frame delay minus a one horizontal line delay. The response of delay 508 is applied to multiplier 510. Multiplier 502 is responsive to a weighting coefficient $W_1$ to produce a weighted one pixel delay signal that is applied to adder 512. Multiplier 506 is responsive to a weighting coefficient $W_2$ to produce a weighted one line delay minus a one pixel delay signal that is applied to adder 512. Similarly, a weighted coefficient $W_2$ is applied to multiplier 510 whose output is added by adder 512. The adder 512 output C' is quantized by quantizer 514 to produce control signal C.

The coefficient $W_1$ is determined experimentally by applying a stream of signals d' of a known signal to a delay 500 by computer simulation and then multiplying the delay response by different factors in the range of 0 to one, the sum of $W_1$, $W_2$ and $W_3$ being one. The value of $W_1$ is selected which gives the best correlation and lowest entropy, i.e., the smallest $\sigma$, FIG. 4c. The coefficient $W_2$ is derived similarly. $W_3$ is $1-W_1-W_2$. The control 300 of FIG. 5 is a general case. By way of example, a specific case may be one where $W_1$ has a value one and $W_2$ and $W_3$ are each zero. Adder 512 sums the weighted signals to produce an output signal C' which is estimated to have the best correlation for a given signal d'. Since signal C' is derived from previous prediction error signals, no additional overhead channel based width needs to be allocated for transmission of the control signals. In other words, the output signal C' is an improved estimate of the current prediction error.

The signal C' is further quantized by quantizer 514 to produce control signal C. Quantizer 514 reduces the number of output levels of signal C' to reduce the number of the look up tables of pre-encoder 302 FIG. 3. The quantizer 514 tends to reduce the coding efficiency of a controlled encoder/decoder somewhat. Therefore, the controller quantizer 514 can have different characteristics then the modulator quantizer 305. The number of output levels of quantizer 514 is set to provide optimum coding efficiency for a given hardware cost.

Assume the signal C', FIG. 5, is the prediction error at the previous pixel. The control signal C' is in effect a predictor of the prediction error. The signal C' predicts the prediction error with a certain probability of error. Assume seven levels of probability for simplicity of explanation. Table II shows the relation between the various levels of prediction error and the control signal.

TABLE II

| Control Signal | | | | | | | |
|---|---|---|---|---|---|---|---|
| $C_1$ | $C_2$ | $C_3$ | $C_4$ | $C_5$ | $C_6$ | $C_7$ | |
| $d'_1$ | $d'_2$ | $d'_3$ | $d'_4$ | $d'_5$ | $d'_6$ | $d'_7$ | $h'_1$ |
| $d'_2$ | $d'_1$ | $d'_2$ | $d'_3$ | $d'_4$ | $d'_5$ | $d'_6$ | $h'_2$ |
| $d'_3$ | $d'_3$ | $d'_4$ | $d'_5$ | $d'_6$ | $d'_7$ | $d'_5$ | $h'_3$ |
| $d'_4$ | $d'_4$ | $d'_1$ | $d'_2$ | $d'_3$ | $d'_4$ | $d'_4$ | $h'_4$ |
| $d'_5$ | $d'_5$ | $d'_5$ | $d'_6$ | $d'_7$ | $d'_3$ | $d'_3$ | $h'_5$ |
| $d'_6$ | $d'_6$ | $d'_6$ | $d'_1$ | $d'_2$ | $d'_2$ | $d'_2$ | $h'_6$ |
| $d'_7$ | $d'_7$ | $d'_7$ | $d'_7$ | $d'_1$ | $d'_1$ | $d'_1$ | $h'_7$ |

Signals $d'_1$, $d'_2$, ... $d'_7$ are the seven levels of prediction error. $C_1$, $C_2$ ... $C_7$ are the seven levels of the control signal C'. $h'_1$, $h'_2$ ... $h'_7$ are the seven elements of the encoded symbol set produced by pre encoder 302, FIG. 3. Table II is constructed as discussed above in connection with Table I. That is, $h'_1$ represents the highest probability of occurrence and $h'_7$ represents the lowest probability of occurrence. The prediction errors d' are arranged then in order of decreasing conditional probability of occurrence. If control 300 has an output signal $C_3$, then for most images $d'_3$ will be the most likely prediction error at the current pixel. The second most likely prediction error for signal $C_3$ is $d'_2$ followed by $d'_4$, $d'_1$, $d'_5$, $d'_6$ and $d'_7$. The pre-encoder 302 is a symbol translator as described above in conjunction with pre-encoder 204 FIG. 2. The pre-encoder maps each prediction error to a unique symbol h' from a symbol set. The mapping is controlled by control signal C.

In FIG. 3, the receiver includes a post-decoder 306 responsive to a signal k'. Signal k' is the recovered decoded signal h' produced by decoder 308. Post-decoder 306 is the inverse of pre-encoder 302 for producing signal e' corresponding to signal d'. Therefore, post-decoder 306 comprises LUTs whose addresses are formed by signals k' and C. Signal C is the output of control 310 identical to control 300. The recovered signal e' is applied to demodulator 250. Since an identical control signal C can be derived at the transmitter and receiver, no overhead channel capacity is allocated for transmission of the control signal C.

In any optimum encoder/decoder arrangement, a codeword LUT is provided for each level of signal C. Each codeword LUT is optimized according to its corresponding conditional histogram prepared for a given digital signal to be transmitted. Since an identical control signal C is used at the transmitter and receiver, the same codewords are used in the LUTs selected at the pre-encoder 302 and post-decoder 306. Simulation of an actual signal for a 33 level control signal C' employing the pre-encoder 302 and post-decoder 306 reduced bit rates by about 30%.

In the alternative, in place of multiple codeword LUTs, the pre-encoder may comprise a single codeword LUT. In this case, the frequency of symbol $h'_i$ is the sum of the frequencies in the $i^{th}$ row of Table II. Simulation has shown that this can reduce bit rates by about 15%.

Figure 6:
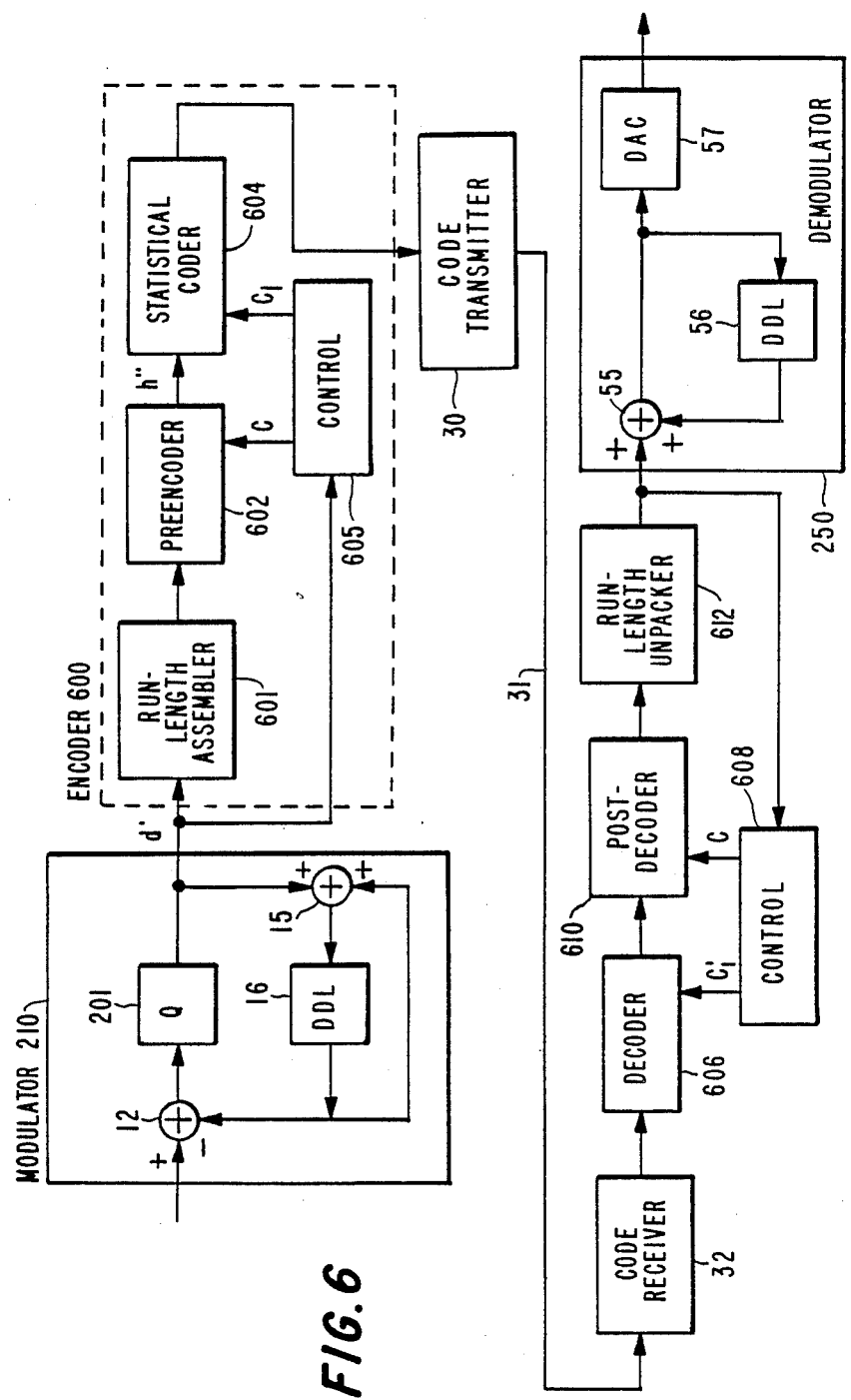

In FIG. 6, encoder 600 includes a dynamically controlled pre-encoder 602, a control 605 and a run length assembler 601 which are applied on an interframe DPCM system with run-length encoding. Zero prediction errors are encoded as blocks of varying block sizes. Since the average block size is larger than one, run-length encoding reduces transmission bit rates. Run-length assembler 601 receives the signal d'. A sequence of consecutive zeros is a zero run. The run-length assembler distinguishes zero from non-zero, counts the pixels in each zero run and replaces each zero run with a unique number, i.e., a run-length. The unique run-length value is used as an address to the pre-encoder 602 which with signal C maps the run length values into a unique symbol set, h''. Control 605 is similar to control 300, FIG. 3, except that control 605 also produces an address signal $C_1$ for causing statistical coder 604 to encode run-length symbols in a known manner. For example, non-zero values may be encoded with straight forward Huffman encoding. However, zero run-lengths may be encoded with a combination of Huffman code prefixes and binary number suffixes, the latter representing the count of zeros in the run length. This latter procedure is known in this art. Signal $C_1$ enables the coder 604 to produce the correct output from the corresponding inputs.

The coder 604 encodes the symbols of signals h'' for transmission. The receiver operates in reverse order employing a run length unpacker 612 at the output of post decoder 610. A receiver control 608 is responsive to the zero run-lengths for also controlling decoder 606 to decode the unique zero run length codewords. Run-length assemblers and unpackers are known in the art.

What is claimed is:

1. Transmission apparatus for a television system employing statistical coding of differential pulse code modulation (DPCM), said transmission apparatus comprising:
   a source of raster-scanned television signal of differing pixel values;
   a differential pulse code modulator for generating a current DPCM signal responsive to said raster-scanned television signal to produce a digitized video signal, said modulator including means for generating an error signal representing the difference between the digitized video signal and a prior prediction signal;
   a first encoding table in a plurality n in number of different encoding tables consecutively ordinally number first to nth, each first table comprising for a given pixel value, a range of probability of occurrence values h for each different current DPCM signal value d to generate a first set of output codes from a respective first set of input codes each of certain length which set is ordinally numbered the same as the encoding table generating it;
   at least one statistical encoding table for responding to said first set of output codes to generate a second set of codes of variable length;
   means responsive to said DPCM signal for deriving a further signal from said error signal, said further signal comprising the prediction for a current DPCM signal sample in each scan line usually based on a sample one line earlier in the DPCM signal; and
   means responding to each DPCM and further signal for selecting the one of said n plurality of encoding tables that is most likely to cause said encoding tables to generate a variable-length code of short bit length and to generate such variable-length code in response to said current DPCM and further signals.

2. Transmission apparatus as set forth in claim 1 wherein:
   said means for deriving said further signal includes means for applying said prior prediction signal to said first table.

3. Transmission apparatus as set forth in claim 1 wherein said means for selecting the one of said plurality of encoding tables that is most likely to generate a code of short bit length includes:
   means for defining first through pth contiguous ranges of said probabilities of occurrences into which successively different ones of said prior predictions will fall; and
   means for selecting the one of said first encoding tables having the same ordinal number as the range in which the current prediction falls.

4. Reception apparatus for a television system employing statistical coding of differential pulse code modulation (DPCM) of signal picture element (pixel) values, said reception apparatus comprising:
   means for receiving a stream of variable-length codes;
   a DPCM demodulator for generating a raster-scanned television signal responsive to a DPCM signal descriptive of said raster-scanned television signal;
   a first statistical decoding table for responding to said stream of variable-length codes to generate a DPCM signal of a first type;

at least one further decoding table included in a plurality n in number of different decoding tables consecutively ordinally numbered first to the nth to generate a respective set of fixed-length codes which set is ordinally numbered the same as the decoding table generating it, each further table comprising for a given range of probability of occurrence values for each different DPCM value and a further signal value, a signal representing a given pixel value, said further signal comprising the prediction for the current DPCM sample in each scan line usually based on the sample one line earlier in the DPCM signal;

means for deriving said further signal from said set of fixed length codes;

means for establishing a prediction for each current picture element in said DPCM signal, based on at least one previously scanned picture element tending to have correlation with the current picture element; and means responding to each DPCM signal of the first type and further signal for selecting that one of said n plurality of further decoding tables that is to generate the fixed-length code to be used as the current sample of said DPCM signal.

5. Reception apparatus as set forth in claim 4 wherein: said means for deriving said further signal includes means for applying said prediction and said further signal to said means for selecting.

6. Reception apparatus as set forth in claim 4 wherein: said means for selecting the one of said n plurality of decoding tables includes means for defining first through nth ranges into which successively different ones of said predictions will fall; and means for selecting the one of said n decoding tables having the same ordinal number as the range in which the current prediction falls.

7. A coder comprising:

a differential pulse code modulator operative on a stream of successive digital samples of an input signal to generate corresponding differential pulse code modulator output samples;

means for generating a predicted sample delayed by a given amount;

memory means including a plurality of stored highly correlated predicted samples responsive to said predicted sample and to said pulse code modulation output samples to output a selected highly correlated prediction sample;

statistical encoding means responsive to said selected highly correlated prediction samples to produce variable length codes corresponding to said selected samples; and control means for generating a means for a prediction sample usually based on a weighted average of a previous sample, said memory means including means responsive to said output samples and to said weighted average of a previous sample to produce said highly correlated samples.

8. The coder of claim 7 wherein the modulator includes means for generating a prior prediction sample from a current prediction sample, said memory means including table means responsive to said modulation output samples and to said prior prediction samples for producing said highly correlated prediction signals.

9. The coder of claim 7 wherein said weighted samples include the weighted average of at least one of: (1) a previous sample, (2) of a sample one line and one pixel earlier, and (3) one frame and one pixel earlier.

10. A decoder for receiving an input signal, said decoder comprising:

means for separating said input signal into successive current statistical codes;

a set of decoder tables containing differential pulse code modulation (DPCM) sample values, each of said tables being addressed in response to said current statistical codes and a further signal to generate said DPCM sample values;

a differential pulse code demodulation receptive of successive differential pulse code modulation sample values from sequentially selected ones of said decoder tables to regenerate a stream of successive digital samples;

means responsive to at least said differential pulse code modulation samples previously supplied from said set of decoder tables for deriving said further signal to thereby select one of said set tables from which a differential pulse code modulation sample is to be taken for current reception by said differential pulse code demodulator; and control means for weighing a delayed differential pulse code modulation (DPCM) sample.

11. The coder of claim 10 wherein said codes of given bit lengths have the same fixed length.

12. The coder of claim 10 wherein said control means includes means for deriving a DPCM signal delayed by one pixel, by one line minus one pixel and by one frame minus one pixel;

means for weighting each said latter delayed DPCM signals, means for summing said weighted signals to produce a numerical weighted signal and applying said numerical signal as said delayed DPCM sample.

13. Transmission apparatus for a television system employing statistical coding of differential pulse code modulation (DPCM), said transmission apparatus comprising:

a source of raster-scanned television signal of differing pixel values;

a differential pulse code modulator for generating a current DPCM signal responsive to said raster-scanned television signal, said modulator including means for generating an error signal representing the difference between the digitized video signal and a prior prediction signal;

a first encoding table in a plurality n in number of different encoding tables consecutively ordinally number first to nth, each first table comprising for a given pixel value, a range of probability of occurrence values h for each different current DPCM signal value d to generate a first set of output codes from a respective first set of input codes each of certain length which set is ordinally numbered the same as the encoding table generating it;

at least one statistical encoding table for responding to said first set of output codes to generate a second set of codes of variable length;

means responsive to said DPCM signal for deriving a further signal from said error signal, said further signal comprising the prediction for a current DPCM signal sample in each scan line usually based on a sample one frame earlier in the DPCM signal; and means responding to each DPCM and further signal for selecting the one of said n plurality of encoding tables that is most likely to cause said encoding tables to generate a variable-length code of short bit length and to generate such variable-length code in response to said current DPCM and further signals.

14. Transmission apparatus for a television system employing statistical coding of differential pulse code modulation (DPCM), said transmission apparatus comprising:

a source of raster-scanned television signal of differing pixel values;

a differential pulse code modulator for generating a current DPCM signal responsive to said master-scanned television signal, said modulator including means for generating an error signal representing the difference between the digitized video signal and a prior prediction signal;

a first encoding table in a plurality n in number of different encoding tables consecutively ordinally number first to nth, each first table comprising for a given pixel value, a range of probability of occurrence values h for each different current DPCM signal value d to generate a first set of output codes from a respective first set of input codes each of certain length which set is ordinally numbered the same as the encoding table generating it;

at least one statistical encoding table for responding to said first set of output codes to generate a second set of codes of variable length;

means responsive to said DPCM signal for deriving a further signal from said error signal, said further signal comprising the prediction for a current DPCM signal sample usually based on a weighted average of the previous sample, of the sample one scan line and one pixel earlier, and one of frame and one pixel earlier; and means responding to each DPCM and further signal for selecting the one of said n plurality of encoding tables that is most likely to cause said encoding tables to generate a variable-length code of short bit length and to generate such variable-length code in response to said current DPCM and further signals.

15. Reception apparatus for a television system employing statistical coding of differential pulse code modulation (DPCM) of signal picture element (pixel) values, said reception apparatus comprising:

means for receiving a stream of variable-length codes;

a DPCM demodulator for generating a raster-scanned television signal responsive to a DPCM signal descriptive of said raster-scanned television signal;

a first statistical decoding table for responding to said stream of variable-length codes to generate a DPCM signal of a first type;

at least one further decoding table included in a plurality n in number of different decoding tables consecutively ordinally numbered first to the nth to generate a respective set of fixed-length codes which set is ordinally numbered the same as the decoding table generating it, each further table comprising for a given range of probability of occurrence values for each different DPCM value and a further signal value, a signal representing a given pixel value, said further signal comprising the prediction for each current DPCM sample usually based on a weighted average of the previous sample, of the sample one scan line and one pixel earlier, and of the sample one frame and one pixel earlier;

means for deriving said further signal from said set of fixed length codes;

means for establishing a prediction for each current picture element in said DPCM signal, based on at least one previously scanned picture element tending to have correlation with the current picture element; and means responding to each DPCM signal of the first type and further signal for selecting that one of said n plurality of further decoding tables that is to generate the fixed-length code to be used as the current sample of said DPCM signal.

* * * * *